Figure 1:
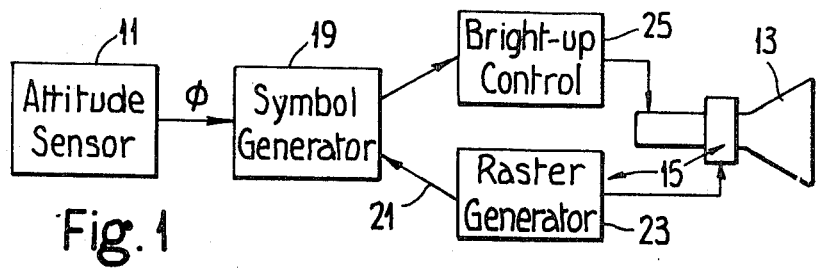

United States Patent

[11] 3,590,311

[72] Inventor Colwyn Francis Stone
 Chatham, England
[21] Appl. No. 851,578
[22] Filed Aug. 20, 1969
[45] Patented June 29, 1971
[73] Assignee Elliott Brothers (London) Limited
 London, England
[32] Priority Aug. 21, 1968
[33] Great Britain
[31] 39,906/68

[54] AIRCRAFT CRT DISPLAY APPARATUS
 3 Claims, 3 Drawing Figs.
[52] U.S. Cl. .................................................. 315/22
[51] Int. Cl. .................................................. H01j 29/72
[50] Field of Search ........................................... 315/22;
 343/11, 108

[56] References Cited
UNITED STATES PATENTS
2,745,985  5/1956  Lewis .......................... 315/22 X
3,025,123  3/1962  Lein, Jr. ...................... 315/22 X Primary Examiner—Rodney D. Bennett, Jr.
Assistant Examiner—Brian L. Ribando
Attorney—Kirschstein, Kirschstein, Ottinger and Frank ABSTRACT: To overcome the distraction caused by small roll angle perturbations of an aircraft, the scanning circuitry of a cathode-ray tube of an aircraft display is effective to scan the tube target an an angle which is significant in relation to earth stabilized horizontal line symbols, e.g. the horizon symbol. Preferably the scanning direction is perpendicular to such horizontal line symbols when the aircraft is "wings level." As a result, the "resulting travelling staircase effect," encountered in the display of horizontal lines in displays in which the scanning direction is parallel to such lines in level flight, is avoided.

PATENTED JUN29 1971 3,590,311

INVENTOR
COLWYN F. STONE

BY Kirschstein, Kirschstein, Ottinger & Frank
ATTORNEYS

AIRCRAFT CRT DISPLAY APPARATUS

This invention relates to display apparatus for aircraft.

The cathode-ray tube has established itself as a display medium of exceptional merit particularly in terms of its flexibility. Display of information in aircraft cockpits has reached a stage where the current electromechanical instruments cannot meet the display flexibility demanded by future aircraft. C.R.T. displays could provide the flexibility, but the space required for installation in a cockpit is also at a premium. Generation of display formats may be performed by discrete strokes on the C.R.T. or by the use of a conventional television raster.

The T.V. raster has significant advantages in terms of the depth of the display unit, (normal to its face) and also of the total power requirements. It suffers from the disadvantage that all display lined, other than those in the precise direction of the raster, are composed of a series of segments in successive raster lines. Although the raster line separation may be near the limit of the eye resolution, the segment lengths are not, particularly when the line is at a small angle to the raster line. The distraction caused by the segments may take several forms. Firstly, the correct length of the segment varies as $\cot \theta$ where $\theta$ is the angle between the display line and the raster line. Secondly, the actual segment length may deviate from the correct length. Thirdly, asynchronous operation of the raster time base and the symbol generating circuits will cause "steps of the staircase" to travel across the frame of a picture which is nominally static.

Because the length of the segment is a function of $\cot \theta$ small perturbations around zero angle cause large changes in length. Any deviation of the segment length from the correct value causes the display line to appear ragged, either as an intermittent or dotted line or as a variable thickness line, due to overlap of adjacent segments. Even when the line and symbol generating time base circuits are synchronous the "travelling staircase" effect is apparent on a symbol line as it approaches the direction of the raster line.

An analysis of the display symbology shows that the requirements for vertical and horizontal lines are very different. If horizon bars and vertical thermometer lines are taken as typical of each case, the horizon bar is earth stabilized and therefore during nominally straight and level flight, would be continuously varying over a small angle relative to the horizontal raster lines. A vertical thermometer line however is fixed relative to the display format.

According to the invention a display apparatus, for an aircraft, comprises:

a. means operative to develop an output signal representing the roll angle of the aircraft;
b. a cathode ray tube and associated electron beam deflection circuitry for producing a master of lines on the target of the cathode ray tube; and, for the purpose of producing horizontal line symbols, e.g. an horizon line symbol on the cathode ray tube target;
c. the roll angle signal is employed to modulate the brightness of the raster; and
d. the cathode ray tube and associated deflection circuitry are arranged, adapted and constructed so that, in straight and level flight and for at least small roll perturbations of the aircraft around straight and level flight, any such horizontal line symbol is formed by the modulation of the brightness of a plurality of raster lines.

The cathode-ray tube and associated circuitry may be arranged adapted, and constructed so that, in straight and level flight, the raster lines are inclined at not less than about 5° with respect to the horizontal line symbol or symbols. Preferably the raster lines are inclined with respect to the horizontal line symbol or symbols by not less than about 10°. In an hereinafter described embodiment the raster lines are substantially perpendicular to the horizontal line symbol or symbols.

Figure 2:
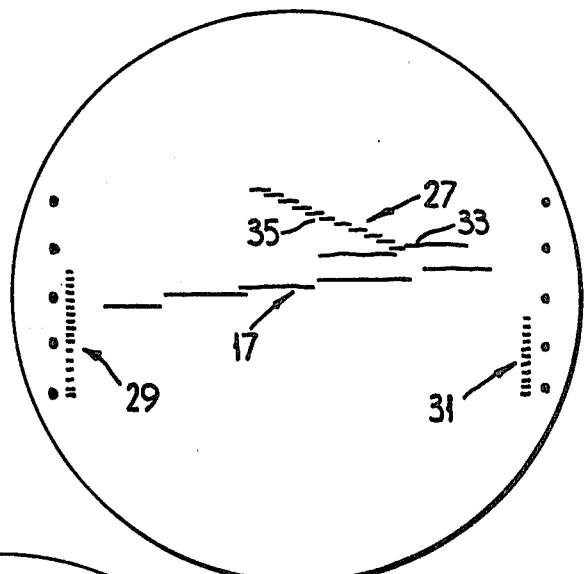
Figure 3:
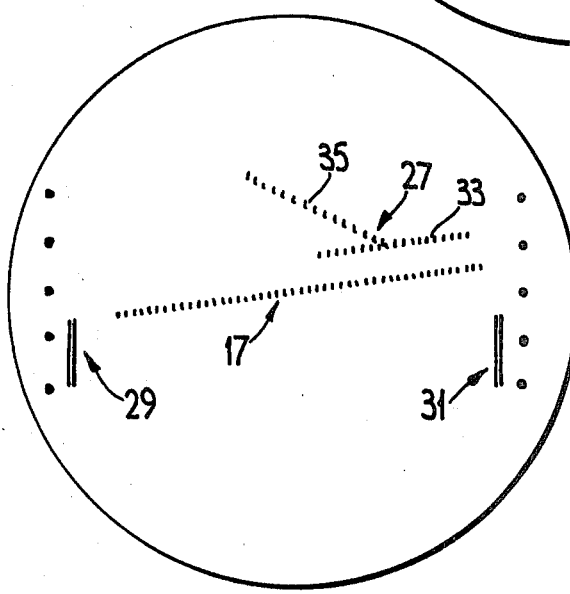

An embodiment of the invention is hereinafter described with reference to the accompanying drawings in which:

FIG. 1 is a block schematic diagram of a display apparatus;

FIG. 2 is a representation of the target of a cathode ray tube showing the form of certain symbols formed by modulation of raster lines which extend transversely in the figure; and FIG. 3 is a representation of the target of a cathode-ray tube showing the form of certain symbols formed by modulation of raster lines which extend between the top and bottom of the figure. The display apparatus (FIG. 1), for an aircraft, comprises means 11 operative to develop an output signal representing the roll angle of the aircraft; and a cathode-ray tube 13 and associated electron beam deflection circuitry 15 for producing a raster of lines on the target of the cathode-ray tube 13. The roll angle signal is employed to modulate the brightness of the lines of the raster so as to produce an horizon line symbol 17 on the cathode-ray tube target; and the cathode-ray tube 13 and associated deflection circuitry 15 are arranged, adapted, and constructed so that, in straight and level flight of the aircraft and for at least small perturbations of the aircraft around straight and level flight, the horizon line 17 is formed by the modulation of the brightness of a plurality of raster lines (FIG. 3).

For modulating the brightness of the raster lines, the roll angle signal from the means 11 is applied to a symbol generator 19. The generation of symbols from the symbol generator 19 is synchronized with each scanning deflection of the electron beam, by a synchronizing signal supplied over line 21 to the symbol generator 19 by a time base controlled raster generator circuit 23, forming part of the deflection circuitry 15 at the commencement of each scanning deflection of the electron beam of the cathode-ray tube.

The raster synchronized signals from the symbol generator 19 are applied to bright up control circuitry 25 which controls the modulation of the brightness of the raster lines.

Conventionally raster lines extend transversely of the C.R.T. With such a raster a cockpit display such as that shown in FIG. 2, may be produced. As shown the display comprises, besides the horizon line symbol 17, a runway symbol 27, an altitude scale 29, and an airspeed scale 31.

The symbols referred to may be divided into two classes: ground stabilized symbols and aircraft stabilized symbols. The horizon and runway symbols 17 and 27 respectively are in the first mentioned class; the altitude and airspeed scales 29 and 31 are in the second class.

So far as aircraft stabilized symbols are concerned the position of the symbols does not vary with time and, accordingly, these symbols may be formed by the cyclic modulation of the same raster lines. Thus, with the altitude and airspeed scales 29 and 31, respectively, the scales may, as shown, comprise a plurality of spaced dots 33 and a plurality of line segments 35. The dots 33 which, in the case of the altitude scale represent a range of altitudes and, in the case of the airspeed scale represent a range of airspeeds, are respectively formed by the cyclic modulation of brightness of the same groups of adjacent transversely extending raster lines. Similarly each line segment 35 is formed by the cyclic modulation of the brightness of one or more raster lines although, where the line segments 35 are concerned, the number of such segments is variable, depending on the altitude and airspeed. Since the scales are aircraft stabilized the cyclic modulation of the raster lines is not affected by aircraft attitude.

The ground stabilized symbols 17 and 27 do, however, vary with aircraft roll and/or heading attitude. As shown, in FIG. 2, the horizon line symbol 17 which, in perfectly straight and level flight is formed by the modulation of the brightness of a single raster line or a plurality of adjacent raster lines, is composed of a number of line segments forming what might be described as a stairway configuration. The number of steps of the stairway is, in practice, continually varying, increasing in number as the roll angle increases. With transversely extending raster lines, there is a travelling stairway effect, always present to some extent, but particularly disturbing to the pilot for small roll perturbations of the aircraft about straight and level flight.

The runway symbol 27, on the other hand, is a ground stabilized symbol and, when flying straight and level, along a runway center line, has symbol portions 33 and 35 at right angles, the symbol portion 35 being then formed by the cyclic modulation of the brightness of the same raster line or group of adjacent raster lines. The symbol portion 35 is, with this aircraft attitude and heading, composed of a plurality of small line segments each formed by the cyclic modulation of one or more raster lines. For aircraft headings such that the aircraft deviates by up to about 85° from the runway direction the symbol portion 35, which represents the runway center line, is composed of line segments which do not exhibit any disturbing moving stairway effect. The symbol portion 33, however, behaves in a manner similar to the horizon line symbol 17 for small roll perturbations, of less than say 5°, with respect to straight and level flight.

With the display of the present invention the behavior of the display symbols under aircraft roll and heading deviations is reversed. As shown in FIG. 3, in which the raster lines are to be imagined as extending between the top and bottom of the figure, the dots of the aircraft stabilized scale symbols are formed in a substantially similar manner to that employed in the display of FIG. 2, the same raster lines being modulated as to brightness cyclically. The actual altitude and airspeed symbols may, as shown, each be formed by the modulation of the brightness of one or more raster lines, the timing and periods of modulation varying according to aircraft altitude and airspeed, respectively.

The ground stabilized horizon line symbol 17 (FIG. 3), is, for all roll attitudes below 90° from straight and level flight, composed of a plurality of small line segments each formed by the modulation of one or more raster lines. Of course, in a 90° aircraft roll and for small roll perturbations from such a roll attitude, the moving stairway effect occurs. It will be appreciated that such roll maneuvers are rarely performed, particularly in transport aircraft and in any case such roll attitudes are of such a transitory nature that the moving stairway effect then observed is so fleeting that it is not likely to seriously disturb the pilot.

The moving stairway effect produced in the horizon symbol as a result of at least small roll perturbations to which the aircraft is, inevitably, subject during straight and level flight, is much more disturbing.

The runway symbol 33, being parallel to the horizon line symbol 17, is, by the same taken, not subject to the moving stairway effect. On the other hand the symbol portion 35 is with the aircraft flying along the runway center line subject to the moving stairway effect for small aircraft heading perturbations. The runway symbol is likely to be employed, e.g. during landing, only for relatively short periods and it is thought that for such landing maneuvers the moving stairway effect may, in practice, be of assistance to the pilot in that the presence and magnitude of the effect conveys, to the pilot, information as to any deviation of the aircraft away from the center line.

I claim:
1. A display apparatus, for an aircraft, which comprises:
means operative to develop an output signal representing the roll angle of the aircraft;
a cathode-ray tube and associated electron beam deflection circuitry for producing a raster of lines on the target of the cathode-ray tube and for producing horizontal line symbols, such as a horizon line symbol on the cathode-ray tube target:
wherein the roll angle signal modulates the brightness of the raster; and
wherein the cathode-ray tube and associated deflection circuitry in straight and level flight and for at least small roll perturbations of the aircraft around straight and level flight, produces such horizontal line symbols by the modulation of the brightness of a plurality of raster lines.
2. An apparatus according to claim 1 in which the cathode-ray tube and associated circuitry, in straight and level flight, produces the raster lines inclined at not less than about 5° with respect to the horizontal line symbols.
3. An apparatus according to claim 1 in which the raster lines are substantially perpendicular to the horizontal line symbols.